Feb. 22, 1949.  E. DANNER  2,462,807
APPARATUS FOR THE MANUFACTURE OF TUBULAR GLASSWARE
Filed April 4, 1944  3 Sheets—Sheet 1

INVENTOR
*Edward Danner*
By Stebbins, Blenko & Webb,
attorneys.

Feb. 22, 1949.   E. DANNER   2,462,807
APPARATUS FOR THE MANUFACTURE OF TUBULAR GLASSWARE
Filed April 4, 1944   3 Sheets-Sheet 2

INVENTOR
Edward Danner
By Stebbins, Blenko & Webb
Attorneys.

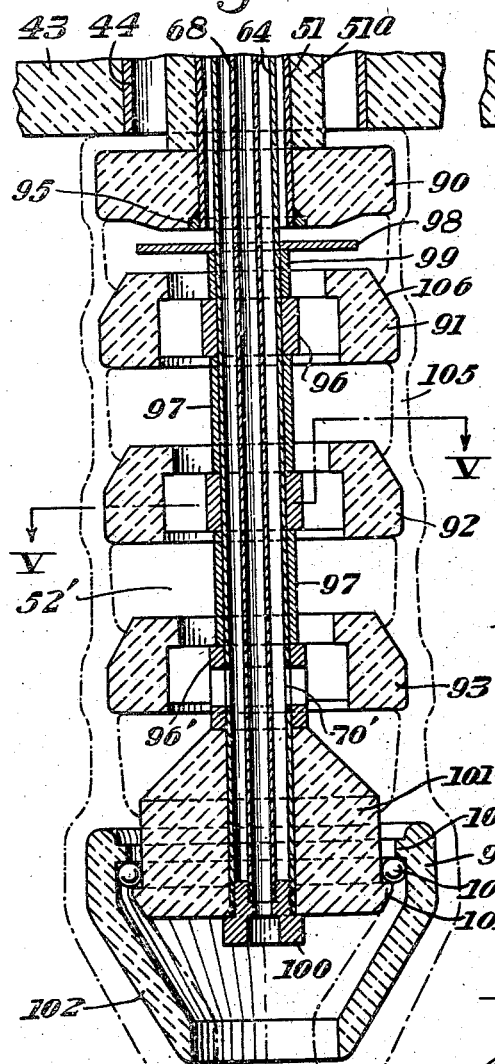
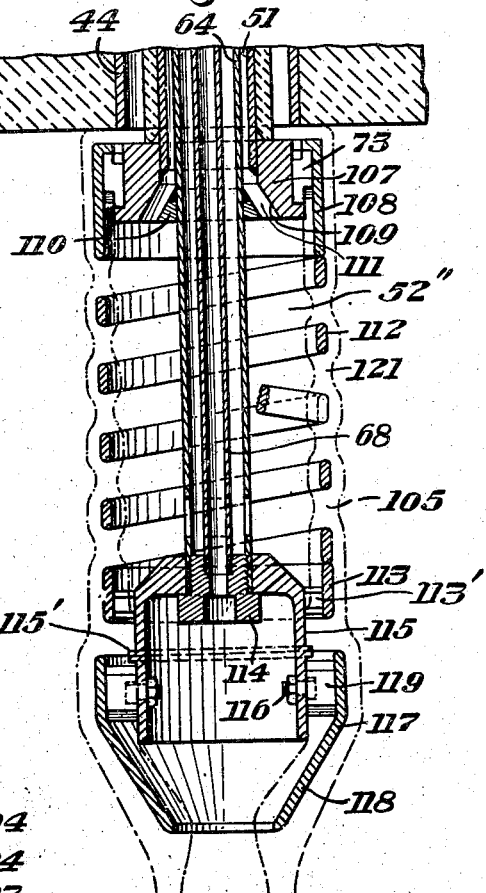
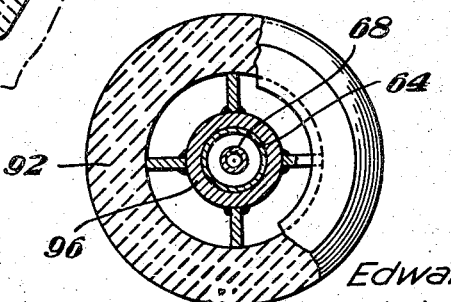
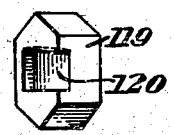

Patented Feb. 22, 1949

2,462,807

UNITED STATES PATENT OFFICE 2,462,807

APPARATUS FOR THE MANUFACTURE OF TUBULAR GLASSWARE

Edward Danner, Newark, Ohio

Application April 4, 1944, Serial No. 529,462

18 Claims. (Cl. 49—17.1)

This invention relates to the manufacture of glassware, particularly glass tube, by continuously delivering a hollow stream downwardly from a source of molten glass over a mandrel and thereby shaping it to cylindrical form as it cools.

Apparatus for the continuous drawing of glass tube has been known heretofore and it is the object of my invention to improve generally on the apparatus used heretofore, in order to produce a superior product at higher speed and lower cost than have been possible with the known equipment. In a preferred embodiment of my invention, I provide a mandrel or glass shaping element for preliminarily shaping a descending annular stream of glass which is adapted successively to impede the downward flow thereof. The mandrel is preferably formed of spaced rings providing spaced surfaces over which the glass passes in succession. However, it may be formed of a wire, bar, strap or rod in the form of a helix or it may be formed as a unitary member with spaced surfaces. Wherever the term "spaced surfaces" or the term "spaced glass intercepting members" is used herein it is intended to include any of these forms and any other forms providing the spaced surfaces. Below the mandrel or preliminary shaping means a final shaping means is preferably provided. The final shaping means may be of any suitable form. For example, it may be composed of a plurality of spaced coaxial nesting shells, cylindrical in form, such as that disclosed and claimed in my copending application Serial No. 512,996. My invention also contemplates the control of the viscosity of the glass stream cascading over the spaced surfaces or glass-intercepting members by supplying a cooling fluid, such as air, to the exterior and interior thereof. My apparatus includes an inlet pipe and an outlet pipe for passing such cooling fluid along the interior surface of the annular stream, the pipes being coaxial and extending into the annular stream of glass as the annular stream passes downwardly over and between the various glass-intercepting members or surfaces. The inlet and outlet pipes serve to support the spaced glass-intercepting members or surfaces. A blow pipe for delivering air to the interior of the finished tube extends downwardly through the outlet pipe.

Further details, novel features and advantages of the invention will become apparent during the following complete description and explanation thereof which refer to the accompanying drawings illustrating the preferred embodiment and modifications. In the drawings, Figure 1 is a partial section through the forehearth of a glass tank in which the apparatus of my invention is shown in elevation;

Figure 4 is a view similar to Figure 3 showing a modified form of apparatus;

Figure 5 is a transverse section taken along the plane of line V—V of Figure 4;

Figure 6 is a similar view showing a further modified form; and

Figure 7 is a perspective view showing a detail of Figure 6.

Figure 1:
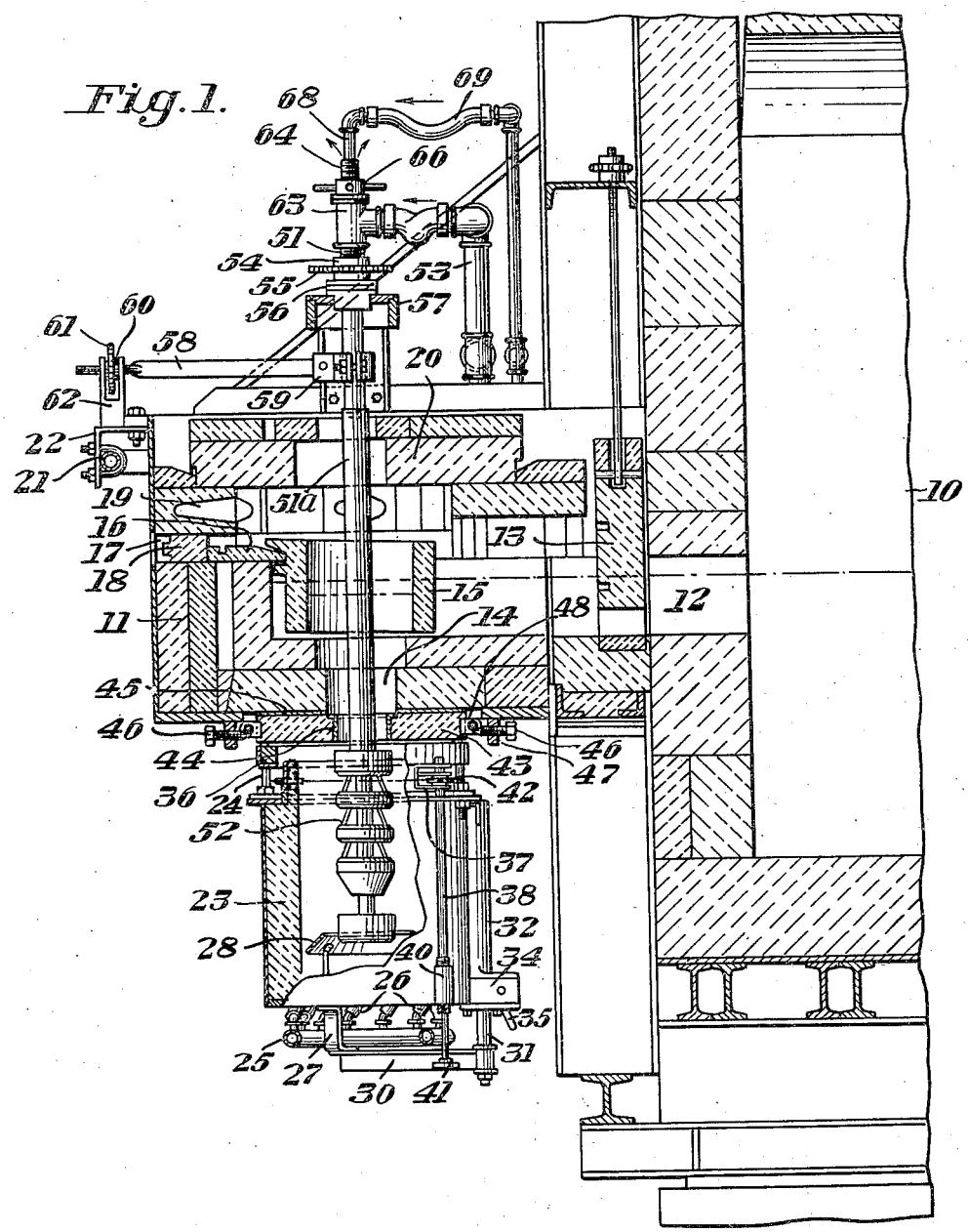
Figure 2:
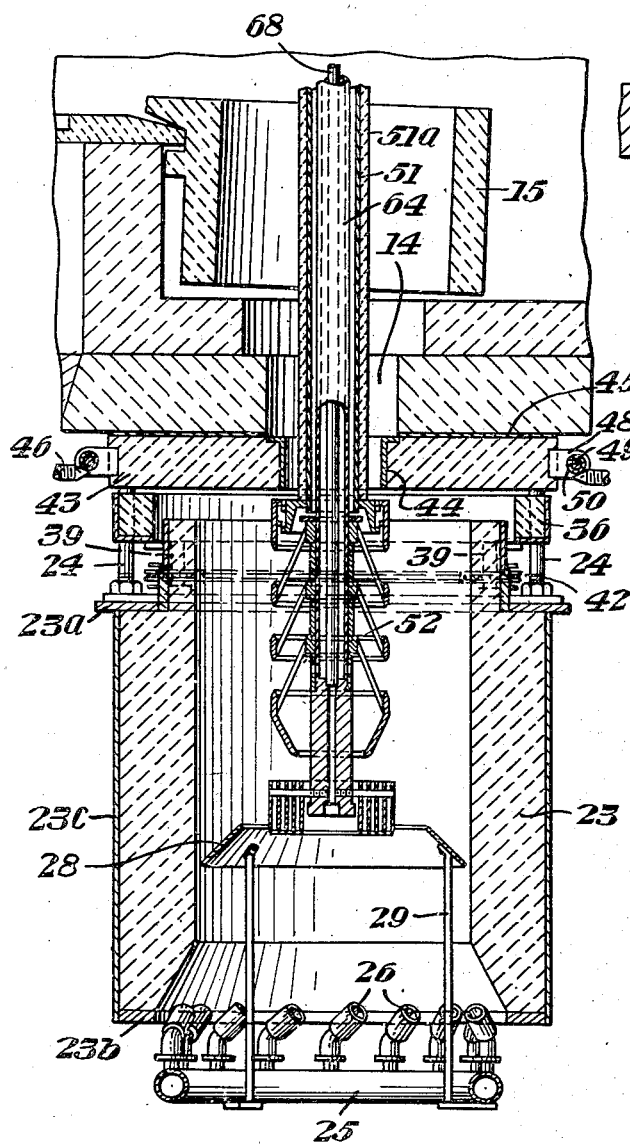
Figure 2 is a partial sectional view showing a portion of Figure 1 to enlarged scale, with the apparatus of my invention in section on an axial plane.

Referring in detail to the drawings and, for the present, to Figures 1 and 2, my invention is there illustrated as applied to a glass-melting tank 10 of conventional construction, having a forehearth 11 projecting therefrom and carried thereby. The glass-melting tank 10 is connected to the forehearth 11 through an outlet 12 controlled by a vertically movable gate 13. The forehearth has a bottom discharge port 14. A distributor 15 in the form of a cylinder of refractory material is placed over the port 14. The distributor is supported on wedge blocks 16 slidably disposed in ports 17 extending radially through the side walls of the forehearth. The wedge blocks are held in position by plugs 18 fitting into the ports 17. Tangential burner ports 19 are formed in the side walls of the forehearth and a cover 20 is disposed on top thereof. A manifold 21 extends around the upper edge of the forehearth for supplying fuel to burners firing into the ports 19. The manifold is secured to brackets 22 mounted on the forehearth. The details of construction thus far described are also disclosed in my copending application above referred to.

A forming chamber 23 suspended below the forehearth is adapted to receive a stream of molten glass descending therefrom through the port 14 at a rate depending on the viscosity of the molten glass and the adjustment of the shaping mandrel to be described shortly. The construction of the forming chamber 23 is generally similar to that disclosed in the aforementioned copending application and also in my copending application, Serial No. 423,255, filed December 17, 1941, for Glassware-forming apparatus. The chamber 23 comprises a cylindrical, refractory-lined, open-bottomed shell suspended on hanger bars 24 projecting downwardly from the forehearth. The lining of the chamber is laid up within the top and bottom plates 23a and 23b and a sheathing 23c. An annular manifold 25 below the chamber has burners 26 adapted to fire upwardly and around the interior of the chamber to aid in controlling the viscosity of the glass descending therethrough. The manifold is carried on brackets 27. A frusto-conical flame deflector 28 is carried on rods 29 upstanding from a Y-shaped arm 30. The arm 30 is carried on a rack bar 31 slidable vertically in a tube 32. A pinion journaled in a housing 34 projecting laterally of the tube 32 meshes with the rack bar whereby, on rotation of the pinion by means of a crank 35, the deflector 28 may be adjusted vertically.

As clearly shown in the drawings, the upper end of the chamber 23 is spaced below the bottom of the forehearth 11. To control the draft upwardly through the chamber, I provide a damper 36 in the form of a refractory-lined ring surrounding the reduced upper end of the chamber. The ring is vertically adjustable, being carried on brackets 37 one of which is mounted on a vertical shaft 38, the others being mounted on nuts threaded on screws 39 projecting upwardly from the shoulder near the upper end of the chamber. The shaft 38 has a threaded portion cooperating with a hub 40 on the outside of the chamber. A hand wheel 41 on the lower end of the shaft 38 permits the latter to be turned. A chain and sprocket drive 42 connects the shaft 38 with the nuts on the screws 39 whereby the rotation of the shaft moves the damper 36 vertically.

In order to limit the flow of molten glass from the forehearth into the forming chamber, I provide a refractory disc 43 having a central hole therethrough in which a metal bushing 44 is positioned. A gasket 45 is disposed between the disc and the bottom of the forehearth. The disc is supported on tapered screws 46 threaded in lugs 47 secured to the bottom of the forehearth. The disc 43 is embraced by metal straps 48 connected by bolts 49. The straps are set into a circumferential groove in the disc. Sleeves 50 on the bolts 49 are engaged by the tapered ends of the screws 46. The disc 43 may thus be forced into firm engagement with the bottom of the forehearth.

A pipe 51 extends downwardly through a hole in the forehearth cover 20, the distributor 15, the port 14 in the bottom of the forehearth, and the bushing 44 in the disc 43. The pipe 51 is enclosed for the greater portion of its length in a refractory tube 51a. The pipe 51 supports a part of the shaping mandrel indicated generally at 52, disposed in the chamber 23 and is connected by piping 53 to a source of cooling fluid, such as air. The piping 53 preferably includes a flexible member or joints to permit adjustment of the pipe 51. The pipe may be adjusted vertically by a nut 54 threaded on the upper end thereof and having a hand wheel 55. The nut rests on a thrust bearing 56. The bearing is mounted on a support 57 carried on the framing of the forehearth. The pipe 51 may be adjusted laterally by a plurality of bars 58 each of which is connected at one end to a clamp 59 engaging the pipe. The other end of each bar is threaded to receive a nut 60 having an operating hand wheel 61. The nut is disposed in a thrust bearing 62 carried on one of the brackets 22.

Figure 3:
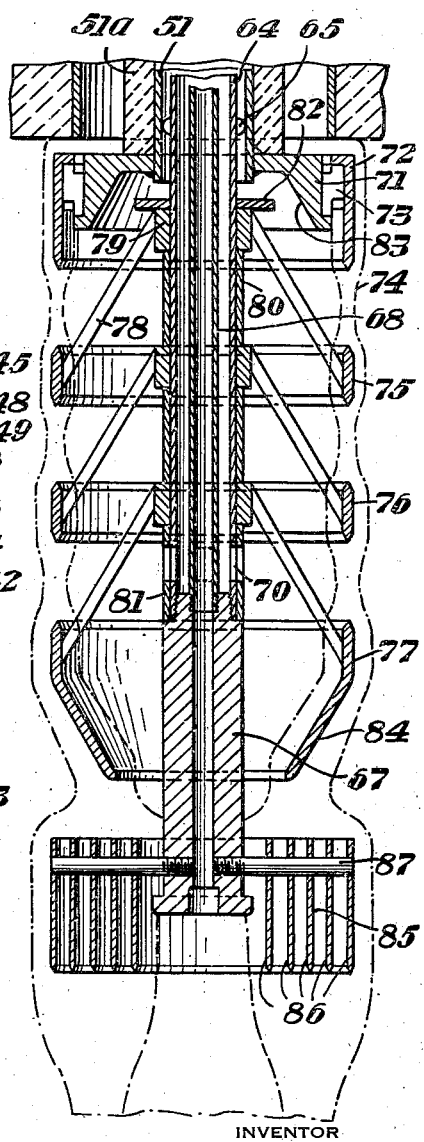
Figure 3 is a partial section showing the preliminary and final shaping means to a further enlarged scale.

The piping 53 is connected to pipe 51 by a T 63. An outlet pipe 64 extends downwardly through the T and the pipe 51, having spacer knobs 65 (see Fig. 3) to position it centrally of the latter. The pipe 64 is carried on a bearing collar 66 threaded on the upper end thereof whereby the pipe 64 may be adjusted vertically in the pipe 51. As shown in Figures 2 and 3, the pipe 51 terminates adjacent the disc 43 but the pipe 64 extends downwardly to about the median transverse plane through the chamber 23. A nozzle 67 is threaded into the lower end of the pipe 64. The pipe 64 is open at its upper end and a blow pipe 68 extends downwardly therethrough, its lower end being threaded into the nozzle 67. The pipe 68 is connected by piping 69 to any convenient source of air under pressure. Holes 70 are formed in the wall of the pipe 64 adjacent the lower end thereof for a purpose which will appear shortly.

A collar 71 is welded to the lower end of pipe 51 and supports a ring 72 spaced radially outward thereof by means of spacer blocks 73 disposed in spaced relation circumferentially thereof. The blocks 73 have their upper and lower edges tapered on the inner and outer sides thereof, respectively, whereby a hollow stream of glass descending through the bushing 44 and flowing over the ring 72, as indicated at 74, while divided by the blocks, is subsequently reunited. The flow of glass through the bushing may be controlled by vertically adjusting the pipe 51 to vary the space between the bushing and collar 71.

Additional rings 75, 76 and 77 are supported on the pipe 64 in vertically spaced relation and coaxially with the ring 72. Each of the rings 75, 76 and 77 is supported by arms 78 extending downwardly and radially from a ring 79 on the pipe 64. The rings 79 are supported in spaced relation by spacer sleeves 80. The bottom ring 79 rests on a spacer sleeve 81 having holes therein in alinement with the holes 70 in the pipe 64. A baffle disc 82 rests on the upper ring 79 and the collar 71 has a frusto-conical recess 83 in the lower surface thereof for a purpose which will be explained presently.

The hollow stream of glass 74 descending through the bushing 44 and over the uppermost baffle ring 72 cascades over the lower rings 75, 76 and 77, partly on the interior and partly on the exterior thereof. It will thus be apparent that the several baffle rings constituting the mandrel 52 serve successively to impede the downward flow of the stream by the fluid friction thereof with the rings. Unrestrained descent of the stream occurs, however, between adjacent rings. The glass starts to cool, of course, on entering chamber 23, the rate of cooling depending on the firing rate for which burners 26 are adjusted. As a result, the descending stream is subjected to a preliminary shaping and is thus brought into cylindrical form. The wall thickness is progressively increased owing to the change in viscosity during its downward movement and the impedance in the descent of the stream afforded by the baffle rings. The bottom ring 77 has a downwardly and inwardly tapering lower portion 84 which effects a contraction and further thickening of the glass stream as indicated in Figure 3, prior to the engagement thereof with a final shaping member 85.

The final shaping means comprises a plurality of nesting coaxial cylindrical shells 86 disposed at a common elevation. The shells may conveniently be supported on radial pins 87 threaded into the nozzle 67 near its lower end. In flowing over the shaping means 85, the hollow stream of glass is brought to truly cylindrical shape and may then be readily drawn continuously downward through the lower end of the chamber 23 and the manifold 25. After passing the latter, it is exposed to the atmosphere and begins to harden progressively so that it may be received by any convenient form of carrier and thereby conveyed in a continuous length to appropriate severing means, in a manner which is well known in the art.

Air is supplied continuously to the interior of the drawn tube through the blow pipe 68. This accelerates the cooling of the drawn tube to a limited extent and sustains it against collapse while still soft. I also supply a cooling fluid through pipe 51 to modify the viscosity of the hollow glass stream flowing down the mandrel or preliminary shaping means to the final shaping means 35. Air discharged from the lower end of the pipe 51 strikes the baffle disc 82 and is deflected by it and the recess 83 in the collar 71 onto the inner surface of the hollow glass stream. The air flows downwardly along the wall of the stream and then passes through the holes 70 and flows back upwardly through pipe 64 and out of the open upper end thereof.

Figure 4 illustrates a modified form of shaping mandrel 52'. Parts of the structure shown in Figure 4 corresponding to parts previously described are designated by the same reference numerals. The modified mandrel or preliminary shaping element includes refractory rings 90 through 93 disposed coaxially. A final shaping element 94 is disposed below the rings and is coaxial therewith. The ring 90 is supported on a metal ring 95 welded to the pipe 51 at its lower end. The rings 91 through 93 are supported on spiders 96, the spiders of adjacent rings being maintained in spaced relation by spacer sleeves 97. A baffle disc 98 is supported above the ring 91 by a sleeve 99.

A spud 100 is threaded into the lower end of pipe 64 and receives the threaded lower end of pipe 68. A refractory bushing 101 rests on the spud 100 and supports the spider 96' on which the ring 93 rests. This spider is generally similar to the spiders 96 but has holes therethrough in alinement with holes 70' in the pipe 64.

The final shaping element 94 has a downwardly and inwardly tapering lower portion 102 and is supported on the bushing 101 by means of balls 103 engaged by an inwardly extending shoulder 104 formed adjacent the upper edge of the ring. The balls rest on an outwardly extending shoulder 101a formed at the bottom of the bushing. The shoulder 104 has vertical grooves adapted to pass the balls 103 when disposed in alinement therewith. When the shoulder has been moved past the balls, the shaping element 94 may be turned so that the grooves are out of alinement with the balls so that the ring will be suspended from its shoulder.

It will be apparent that the shaping mandrel 52' shown in Figure 4 functions in about the same way as that already described, to impart a cylindrical shape and to form a hollow stream of glass descending through the bushing 44, as indicated at 105. The stream 105, however, passes over the exterior only of the rings 90 through 93, the rings 91 through 93 having a frusto-conical upper portion 106 which guides the stream cascading downwardly over the edges and exterior surfaces thereof. The stream passes partly on the inside of the final shaping element 94, however, and partly on the outside thereof. As it passes over the final shaping element, the stream is brought to final shape. A cooling fluid may be supplied to the interior of the stream 105 through pipe 51, as already explained. Air or other gas supplied through the pipe 51 strikes baffle disc 98 and then flows downwardly through the rings 91 through 93 between the radial arms of the spiders 96 and thence through holes 70' and back upwardly through pipe 64.

Figure 6 illustrates a further modified form of shaping mandrel 52'' for the glass stream, in which the surfaces or spaced glass-intercepting members are adjacent turns of a helix formed from flat stock. As shown in the drawings, a collar 107 welded to the lower end of pipe 51 carries a ring 108 on spacer blocks 73. The lower face of the collar has a frusto-conical recess 109 therein and a correspondingly shaped ring 110 welded to the pipe 64 cooperates therewith to define an annular downwardly flaring passage 111 through which a cooling medium delivered through pipe 51 is discharged. A helix 112 formed from flat stock extends downwardly from the ring 108, being welded thereto at its upper end. As shown in the drawings, the successive turns of the helix are spaced apart by a distance slightly greater than the width of the stock from which the helix is formed, thereby providing a plurality of spaced surfaces or members approaching in shape and function the rings 75 and 76 of Figure 3. It is to be understood, however, that the spacing and the width of the surfaces or members may vary, depending on the nature of the glass to be formed into ware.

A spud 114 threaded in the lower end of pipe 64 receives the threaded lower end of pipe 68 and supports the bell 115. The bell 115 acts as a supporting member for the final shaping element 117 and also acts as a partial support for the preliminary shaping element comprising the ring 108, the helix 112 and the ring 113. The bottom ring 113 which is welded to the lower end of the helix, is supported by the bell by a plurality of spaced keys 113' which are welded to the inner face of the ring 113 and the outer surface of the bell. These keys are tapered to permit ready flow of the glass therearound. In this way a part of the weight of the preliminary shaping element and of the glass thereon is supported by the bell, the remainder being supported by the ring 108 and the collar 107.

The bell has radial bolts 116 spaced circumferentially thereof and the final shaping element 117 is supported thereby. The final shaping element 117 has a downwardly and inwardly tapering lower portion 118. The shaping element is provided with blocks 119 pointed at the top and bottom and having recesses 120 in their inner faces adapted to receive the heads of the bolts 116. The blocks are welded on the interior of the element with the open sides of their recesses facing in opposite direction so that the element may be hung on the bell by telescoping it with the latter and then turning it when the recesses 120 are at the same elevation as the bolt heads. A shoulder 115' extends circumferentially around the bell and is provided for convenience in alining these parts to the same elevation.

The shaping mandrel 52'' shown in Figure 6 operates in about the same manner as those previously described to give the desired shape and uniform flow to the hollow stream of glass 105 descending through the bushing 44 and cascading over the turns of the helix. The stream 121 passes partly within the turns of the helix 112 and partly on the exterior thereof, as in the case of the preliminary shaping means of Figure 3. After passing over the final shaping element 117, the stream is brought to final size and shape, as already described.

In describing the shaping elements of Figures 4 and 6 I have referred to the elements 94 and 117 as the final shaping elements and in describing the shaping element of Figures 1, 2, and 3 I have described the final shaping element as being the plurality of nested shells. It will be apparent however to those skilled in this art that in any structure embodying the present invention the final shaping element is the last element over which the glass flows and from which it is discharged in the form of ware.

It will be apparent from the foregoing description that in my improved apparatus the molten glass forms a hollow descending stream of glass which passes downwardly over the spaced surfaces and is shaped into a continuous length of tubing which is cylindrical and of suitable wall thickness. As the glass passes downwardly over the mandrel, both the inside and outside surfaces of the hollow stream may be cooled so as to modify the viscosity of the glass to meet the required conditions. During its downward passage over the mandrel, the glass, during a portion of the time, is out of contact with a supporting surface, and hence the inner surface can be cooled more rapidly than would be the case if the glass were in contact with the mandrel throughout its entire downward travel. This means that a more rapid temperature change can be effected, more glass can be tempered for a given size mandrel, a shorter mandrel can be used, and less surface contact occurs between the glass and the mandrel while it is flowing to the ware-forming point. Thus the glass is passed rapidly through the critical temperature range at which devitrification occurs and, as a consequence, there is less likelihood of devitrification. Moreover, a tubing of any given size and wall thickness can be produced more rapidly where my invention is employed than with the known prior art methods.

The several forms of shaping means shown are of relatively simple construction and inexpensive to manufacture. At the same time, they are well adapted to perform their intended function effectively and have a long, useful life. To this end, the exposed metal parts are preferably composed of a heat-resistant alloy, such as Nichrome.

The present application is a continuation-in-part of my copending application Serial No. 498,971, filed August 17, 1943, which issued as Patent No. 2,420,934, on May 20, 1947, and which is a continuation-in-part of my application Serial No. 235,300, filed October 17, 1938 and subsequently abandoned.

Although I have illustrated and described but a preferred embodiment of my invention, with modifications, it will be understood that changes in the construction herein disclosed may be made without departing from the spirit of the invention or the scope of the appended claims.

I claim:

1. In apparatus for forming tubular glassware, a source of molten glass, means for forming the glass into a downwardly flowing annular stream, a glass shaping element, and means for supporting the shaping element in the path of said stream, said supporting means extending axially of and vertically through the downwardly flowing annular stream of glass, said shaping element comprising a plurality of superposed substantially annular glass-intercepting members forming a hollow, substantially cylindrical shaping element, whereby the glass as it passes downwardly over the shaping element is intercepted repeatedly by said glass intercepting members and flows freely out of contact with the element as it passes from one member to another.

2. The apparatus defined by claim 1 characterized by said glass-intercepting members being rings so positioned as to cause the glass to flow downwardly over the interior as well as the exterior thereof.

3. The apparatus defined by claim 1 characterized by said glass-intercepting members being rings shaped at their upper edges to confine the downwardly flowing glass to the exterior surfaces thereof.

4. A glass shaping element for use in the formation of tubular glassware comprising a plurality of superposed substantially annular glass-intercepting members, the glass-intercepting members in any longitudinal plane through the element being spaced vertically relative to each other, and supporting means extending axially of the glass intercepting members.

5. In apparatus for forming tubular glassware, a glass shaping element comprising a plurality of superposed substantially annular glass-intercepting members, the glass-intercepting members in any longitudinal plane through the element being spaced vertically relative to each other, means for supplying molten glass in the form of an annular, descending stream to the uppermost of said glass-intercepting members, the lower members being arranged to receive glass from said uppermost members as it passes in annular form downwardly over the element, and means for supporting the glass shaping element in the path of said stream, said supporting means extending axially of and vertically through the downwardly flowing annular stream of glass.

6. In apparatus for forming tubular glassware, a glass shaping element comprising a plurality of superposed substantially annular glass-intercepting members, the glass-intercepting members in any longitudinal plane through the element being spaced vertically relative to each other, means for forming molten glass into an annular, descending stream, and means for supporting said shaping element substantially vertically within the path of the downwardly flowing annular stream of glass.

7. In an apparatus for forming tubular glassware, a source of molten glass adapted to deliver an annular descending stream, a glass-shaping element for preliminarily shaping said stream comprising a plurality of superposed substantially annular glass-intercepting members over which the stream flows successively, supporting means extending axially within the descending stream of glass for supporting said glass-intercepting members in the path of said stream, a final glass-shaping element, and means positioned within said annular stream of glass for supporting the final glass-shaping element below the lowermost of said glass-intercepting members and in position to receive glass discharged therefrom and permit it to flow thereover and be discharged therefrom in the form of ware.

8. The apparatus defined in claim 7 characterized by said glass-intercepting members being rings so positioned as to cause the glass to flow downwardly over the interior as well as the exterior thereof.

9. The apparatus defined by claim 7 characterized by said glass-intercepting members being successive turns of a continuous helix.

10. The apparatus defined by claim 7 characterized by said glass-intercepting members being shaped adjacent their upper edges to confine the downwardly flowing glass to the exterior thereof.

11. In an apparatus for forming tubular glassware, a source of molten glass adapted to deliver an annular descending stream, a glass-shaping element for shaping said stream comprising a plurality of superposed substantially annular glass-intercepting members over which the stream flows successively, supporting means for supporting said glass-intercepting members in the path of said stream, the lowermost of said members being arranged to cause glass to flow downwardly thereover on the inside and outside thereof, means for supplying cooling gas to the interior of said annular stream of glass, and separate means for supplying a blowing gas within the descending glass stream adjacent the lower end of said shaping means.

12. In apparatus for forming tubular glassware, a source of molten glass adapted to deliver a descending annular stream, a glass-shaping element comprising a plurality of superposed substantially annular glass-intercepting members over which the stream flows successively, and supporting means for supporting said glass-intercepting members in the path of said stream, the lowermost of said members being tapered inwardly toward the bottom thereof, said supporting means extending axially of and vertically through the downwardly flowing hollow stream of glass.

13. In an apparatus for forming tubular glassware, a source of molten glass adapted to deliver an annular descending stream, a shaping element for shaping said stream comprising a plurality of superposed substantially annular glass-intercepting members over which the stream flows successively, means for supplying a cooling fluid interiorly of and in contact with the annular glass stream as it flows between said members, and means for supplying gas interiorly of the glass stream adjacent the lower end of said shaping means for maintaining the desired shape of the glass as it passes beyond the shaping means.

14. In an apparatus for forming tubular glassware, a source of molten glass adapted to deliver a hollow descending stream, means for controlling and shaping the stream comprising a plurality of vertically spaced glass-intercepting members disposed coaxially in the path of the stream, whereby the stream cascades successively downwardly over said members, and coaxial inlet and outlet pipes within said stream for circulating a cooling fluid through the interior of the stream of glass descending over said members, the inlet pipe terminating adjacent the upper member and the outlet pipe terminating adjacent the lower member.

15. In an apparatus for forming tubular glassware, a source of molten glass adapted to deliver a hollow descending stream, means for controlling and shaping the stream comprising a shaping element having a plurality of vertically spaced members disposed coaxially in the path of the stream, whereby the stream cascades successively downwardly over said members, coaxial inlet and outlet pipes for circulating a cooling fluid through the interior of the stream of glass as it descends over said members, the inlet pipe terminating adjacent the upper member, the outlet pipe terminating adjacent the lower member, and a blow pipe extending through the inlet and outlet pipes to a point adjacent the lower end of said shaping element.

16. In an apparatus for forming tubular glassware, a source of molten glass adapted to deliver a hollow descending stream, means for controlling and shaping the stream comprising a shaping element having a plurality of vertically spaced members disposed coaxially in the path of the stream, whereby the stream cascades successively downwardly over said members, and coaxial inlet and outlet pipes for circulating a cooling fluid through the interior of the stream of glass as it descends over said members, the inlet pipe terminating adjacent the upper member and the outlet pipe terminating adjacent the lower member, said members being carried on said outlet pipe.

17. In apparatus for forming tubular glassware, a source of molten glass adapted to deliver a descending stream, a glass shaping element for shaping said stream comprising a plurality of vertically spaced glass intercepting members over which the stream flows successively, one of said members consisting of a plurality of nested coaxial shells, supporting means for supporting said vertically spaced glass intercepting members in the path of said stream with said coaxial shells disposed in substantially a common level at the lowermost level of said glass shaping element.

18. In an apparatus for forming tubular glassware, a source of molten glass adapted to deliver an annular descending stream, means for controlling and shaping the stream comprising a plurality of superposed substantially ring-like members disposed in the path of the stream, whereby the stream cascades successively over said members, supporting means extending axially downwardly within said descending stream for supporting said ring-like members, and means for regulating the quantity of glass fed to the uppermost of said members.

EDWARD DANNER.

REFERENCES CITED

The following references are of record in the file of this patent:

UNITED STATES PATENTS

| Number | Name | Date |
| --- | --- | --- |
| 1,653,848 | Grotta | Dec. 27, 1927 |
| 1,766,638 | Howard | June 24, 1930 |
| 1,873,685 | Voss et al. | Aug. 23, 1932 |
| 2,133,662 | Gray | Oct. 18, 1938 |
| 2,212,448 | Modigliani | Aug. 20, 1940 |

FOREIGN PATENTS

| Number | Country | Date |
| --- | --- | --- |
| 38,432 | France | Mar. 3, 1931 |
| 428,421 | Great Britain | May 13, 1935 |